United States Patent [19]
Pilkington

[11] Patent Number: 5,638,059
[45] Date of Patent: Jun. 10, 1997

[54] AUDIBLE ALTIMETER FOR PARACHUTISTS

[76] Inventor: George Pilkington, Cool & Groovy Fridge Co , Ivy Cottage North St. Swinford, Leicestershire LE176BE, England

[21] Appl. No.: 591,966

[22] Filed: Jan. 29, 1996

[51] Int. Cl.⁶ .................................................. G08B 23/00
[52] U.S. Cl. ......................... 340/970; 340/977; 73/386; 116/268
[58] Field of Search ........................ 340/970, 977, 340/963, 971, 611; 244/142, 147, 187, 149, 150; 73/384, 385, 386, 179; 364/433; 116/266, 268, 276

[56] References Cited

U.S. PATENT DOCUMENTS

| | | | |
|---|---|---|---|
| 3,623,051 | 11/1971 | June et al. | 73/386 |
| 3,797,308 | 3/1974 | Crane | 73/386 |
| 4,694,694 | 9/1987 | Vlakanic et al. | 73/386 |
| 4,783,027 | 11/1988 | Jones | 244/149 |
| 4,858,856 | 8/1989 | Cloth | 244/149 |
| 4,868,916 | 9/1989 | Ablov et al. | 340/970 |
| 4,916,448 | 4/1990 | Thor | 340/970 |
| 5,031,160 | 7/1991 | Koizumi et al. | 368/10 |
| 5,189,646 | 2/1993 | Sako et al. | 368/10 |
| 5,295,085 | 3/1994 | Hoffacker | 364/558 |
| 5,423,215 | 6/1995 | Frankel | 73/386 |

*Primary Examiner*—Thomas Mullen
*Assistant Examiner*—Benjamin C. Lee
*Attorney, Agent, or Firm*—Leo Zucker

[57] ABSTRACT

The invention relates to an audible altimeter for use by parachutists. The altimeter comprises a sensor means 6 for sensing ambient air pressure, an electronic processor 5, a sounder device 4 and control buttons 2,3. The electronic processor 5 is programmed to determine the height of the altimeter above ground level and send said signals to said sounder device 4 during the parachutist's descent causing said sounder device 4 to emit a first audible signal at a first predetermined height above ground level and a second audible signal at a second predetermined height.

15 Claims, 8 Drawing Sheets

AUDIBLE ALTIMETER FOR PARACHUTISTS

This invention relates to an audible height indicator (or altimeter) and in particular, although not exclusively, to an altimeter for use by free-fall parachutists.

There are two main types of altimeter in use at present by skydivers. The first is a visual altimeter, usually worn on the wrist or harness, which provides a continuous indication of the skydiver's altitude. This type may use analogue or digital altitude sensing and display means.

The second type, which is normally used as a back-up to the first type, is an audible warning device, which is usually worn inside or outside the helmet and provides an audible signal when the skydiver reaches a predetermined height. This warns the skydiver that he (male gender is assumed purely for the sake of simplicity) has reached the predetermined height, or the pre-set height which may, for example, be the height at which he has decided to deploy his parachute. The present invention is concerned mainly with this second type of altimeter.

An example of an altimeter of the second type is that sold under the Trade Mark DYTTER. This device includes a bellows-type pressure sensing device that is mechanically connected to an electrical switch, which forms part of a signal generating circuit. As a skydiver falls, the bellows are gradually compressed by the increasing air pressure and, when the skydiver reaches a preselected altitude, the contacts of the switch open and the device generates an audible signal. The skydiver then knows that he has reached the pre-set height.

It is a fact that skydivers sometimes choose to ignore this signal, for example because they wish to complete a manoeuvre before deploying their parachute or because they need to move clear of another skydiver. Skydivers also sometimes fail to recognise the signal, perhaps because they are preoccupied with some other aspect of their descent. This can have fatal consequences and it has been estimated that 41% of all skydiving fatalities in 1993 can be attributed directly to loss of altitude awareness. There is clearly, therefore, a need for an altimeter that provides for improved altitude awareness.

A further disadvantage of the known audible warning device is that it has to be manually set to the ground level before every take off and, because it relies on analogue technology, is only accurate to within approximately ±200 ft. If the warning device is not carefully set before take-off, the accuracy may be worse than this. In an extreme case, if the user completely forgets to set the device before take-off, the accuracy may be very poor, particularly if the weather conditions or the height of the drop zone are significantly different from when the device was last set.

It is an object of the present invention to provide an audible height indicator (hereinafter, an altimeter) that mitigates at least some of the aforesaid problems.

According to the present invention, there is provided an altimeter for use by parachutists, the altimeter comprising a sensor means for sensing ambient air pressure and generating a signal P representing the sensed pressure, a first digital electronic memory $M_{GL}$ for storing a value $P_{GL}$ determined from the ambient air pressure signal P at ground level, and means for entering said value $P_{GL}$ into said memory, a digital electronic processor means connected to said sensor means and said first memory $M_{GL}$ and programmed to determine from said signal P and said value $P_{GL}$ the height $H_{AGL}$ of the altimeter above ground level, a second digital electronic memory $M_{BO}$ for storing a value $H_{BO}$ representing a desired break off height and means for entering a value into said second memory, a third digital electronic memory $M_{SDH}$ for storing a value $H_{SDH}$ representing a predetermined standard deployment height, and a sounder device connected to said digital electronic processor so as to receive a signal therefrom and emit an audible signal when said signal is received, said digital electronic processor being connected to said second and third memories $M_{BO}$ and $M_{SDH}$ and programmed to compare said height $H_{AGL}$ with said values $H_{BO}$ and $H_{SDH}$ and to send said signals to said sounder device causing said sounder device to emit a first audible signal when said height $H_{AGL}$ corresponds to the value $H_{BO}$ and a second audible signal when the sensed height $H_{AGL}$ corresponds to the value $H_{SDH}$.

The use of digital electronics and digital electronic memories to initiate the altitude warning signals, instead of the simple mechanical switch of the prior art warning device, also makes it possible to provide warning signals at more than one altitude. This is of major importance in improving the safety of skydiving, as it provides the parachutist with a second warning to deploy his parachute, in case he did not hear or ignored or forgot about the first signal. The parachutist is thus provided with considerably more information about the progress of his descent, without having to look at his visual altimeter.

A further advantage provided by the present invention is that it can be zeroed to ground level very accurately, simply be entering the ambient pressure value at ground level into a memory. In the prior art altimeter, zeroing requires that the mechanical switch contact is manually adjusted until it just opens. This is not an easy operation and inevitably results in a degree of inaccuracy. A further manual adjustment is then required to set the altimeter to the desired break off height, which compounds the error introduced upon zeroing. As a result, accuracies of better than ±200 ft are rarely achieved. In contrast to this, because in the present invention both the ground level setting and the break off height setting are entered digitally, accuracies of ±30 ft at a height of 2000 ft can be achieved. The altimeter is therefore much more accurate and reliable than prior art analogue warning devices.

The digital electronic processor means advantageously comprises a programmable interface controller.

The means for entering said value $H_{BO}$ into said memory $M_{BO}$ may comprise a manually operable switch means.

The means for entering said value $P_{GL}$ into said memory $M_{GL}$ may comprise a manually operable switch means.

The digital electronic processor means may be programmed to enter said value $P_{GL}$ into said memory $M_{GL}$ at predetermined time intervals, thereby avoiding the need to zero the altimeter manually.

Advantageously, the altimeter is switchable between a stand-by state, in which power consumption is reduced, and an active state, in which the pressure signal P is constantly monitored, and said digital electronic processor means is programmed to switch the altimeter to said active state when a rapid increase in altitude is sensed. The need to switch the altimeter on and off manually is thereby avoided, so removing a further possible cause of human error.

The digital electronic processor means may be programmed to sense the pressure signal P at predetermined time intervals when in the stand-by state and to switch the altimeter from the stand-by state to the active state in accordance with sensed changes in the pressure signal P.

The digital electronic processor means may be programmed to switch the altimeter from the stand-by state to the active state when the difference between the pressure signal P and the stored value $P_{GL}$ exceeds a predetermined limit.

The digital electronic processor means may be programmed to send a signal to the sounder device causing the device to emit an audible signal when the altimeter switches from the stand-by state to the active state.

The digital electronic processor means may be programmed to sense completion of the descent and to switch the altimeter from the active state to the stand-by state after completion of the descent is sensed.

The digital electronic processor means may be programmed to send a signal to the sounder device causing the device to emit an audible signal when, during the ascent, the sensed height $H_{AGL}$ exceeds the value $H_{BO}$.

Advantageously, the altimeter includes a source of electrical power and said digital electronic processor means is programmed to monitor the state of charge of said source of electrical power and to send a signal to activate said sounder device when said state of charge falls below a predetermined value.

Advantageously, the altimeter includes a fourth digital electronic memory $M_{MDH}$ for storing a value $H_{MDH}$ representing a predetermined minimum deployment height, and said digital electronic processor is connected to said fourth memory $M_{MDH}$ and programmed to compare said height $H_{AGL}$ with said value $H_{MDH}$ and to send a signal to activate said sounder device when said height $H_{AGL}$ corresponds to the value $H_{MDH}$. The altimeter is then able to provide an audible altitude warning at three different heights, so ensuring that the parachutist is kept even more fully informed of the progress of his descent.

The digital electronic processor means may be programmed to monitor the rate of descent and to disable said means for entering said values $H_{BO}$ and $P_{GL}$ into said memories $M_{BO}$ and $M_{GL}$ when the rate of descent exceeds a predetermined value. This avoids the possibility of the values stored in the memories being accidentally adjusted after the descent has commenced.

The digital electronic processor means may be programmed to monitor the rate of descent and to discontinue sending signals to activate said sounder device when the rate of descent falls below a predetermined value.

An embodiment of the invention will now be described, by way of example, with reference to the accompanying drawings, of which.

Figure 1:
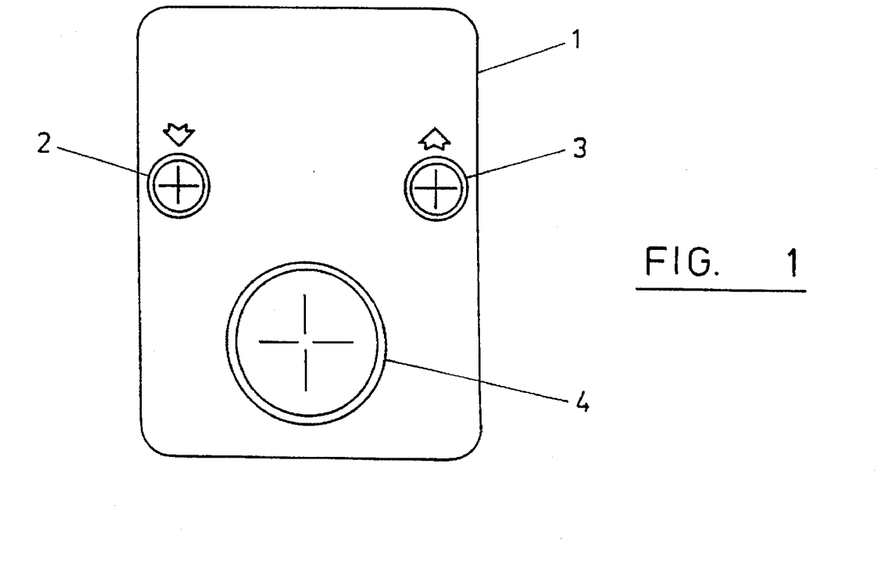
FIG. 1 is a front view of the device.

Referring to FIG. 1, the altimeter includes a casing 1 of plastics material, a pair of control buttons 2,3 having "up" and "down" indicator arrows and an audible sounder device 4. The altimeter is designed to fit securely within a skydiver's helmet, near to one ear.

Figure 2:
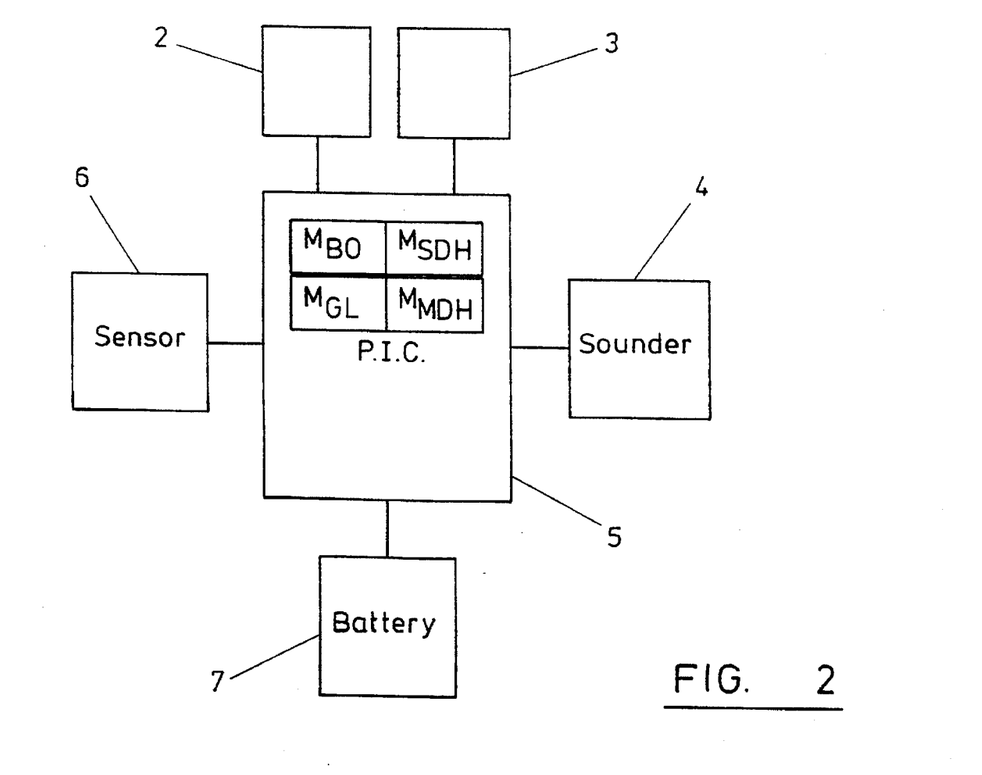
FIG. 2 is a block diagram of the electronic components of the device.

The electronic circuit, which is shown in simplified form in FIG. 2, includes a micro-controller 5, to which are connected a solid state pressure sensor 6, a battery 7, the piezoelectric sounder device 4 and the two control buttons 2,3. The micro-controller 5 is preferably a programmable interface controller (or PIC) of the device type number PIC16C71-04I/SO.

The pressure sensor 6, which is preferably a surface mounted silicon-based sensor, is connected to an input terminal of the micro-controller 5 and arranged to send to the micro-controller a signal representing the ambient air pressure P.

The control buttons 2,3 are also connected to input terminals of the micro-controller 5 and are arranged to control operation of the micro-controller. In particular, the buttons are used to enter a data value $H_{BO}$ into a memory $M_{BO}$, which value represents the chosen break off height: i.e. the height above ground level (AGL) at which the parachutist intends to break off from his free fall activities and deploy his parachute.

The buttons may also be used to enter a data value $P_{GL}$ into another memory $M_{GL}$, which value is determined from the sensed air pressure P at ground level. In other words, the buttons are used to reset the altimeter to ground level on the drop zone. The micro-controller 5 is programmed to reset itself automatically to ground level every 20 minutes and it is therefore only generally necessary to reset the altimeter manually if taking off within 20 minutes of arriving at the drop zone. The micro-controller 5 is programmed to calculate from the difference between the pressure signal P and the data value $P_{GL}$ stored in memory $M_{GL}$ the altitude $H_{AGL}$ of the skydiver above ground level.

The micro-controller 5 includes two further memories $M_{SDH}$ and $M_{MDH}$, the purposes of which are described later.

The sounder device 4 is connected to and controlled by the micro-controller 5. The micro-controller 5 is programmed to activate the sounder device 4 at predetermined values of the parachutist's altitude $H_{AGL}$ and also at certain other times, such as when altering the settings of the altimeter by means of the buttons, and in order to provide a warning of low battery strength. The micro-controller 5 is also programmed to control the characteristics of the audible signals produced by the sounder device 4, such as duration and frequency of those signals.

Also connected to the micro-controller 5 and the other parts of the electronic circuit is the battery 7. The battery supplies electrical power to the components of the electronic circuit and the charge status of the battery is monitored constantly by the micro-controller 5. The micro-controller 5 is programmed to generate an audible warning by means of the sounder device 4 when the amount of electrical energy stored in the battery 7 falls below a predetermined level.

The micro-controller 5 is also programmed to switch the electronic circuitry between a stand-by and an active state, depending on whether the altimeter is in use. This feature of the altimeter will be described in more detail later. The purpose of this arrangement is to reduce drain on the battery when the altimeter is not in use, whilst minimising reliance on input from the user. The aim is to provide an altimeter that is fully automatic and does not require any input from the user, except when changing the break off height $H_{BO}$. In particular, there is no need to switch the altimeter on or off, as it is programmed to switch itself automatically between the stand-by and active states at the beginning and end of each jump.

Figure 3A:
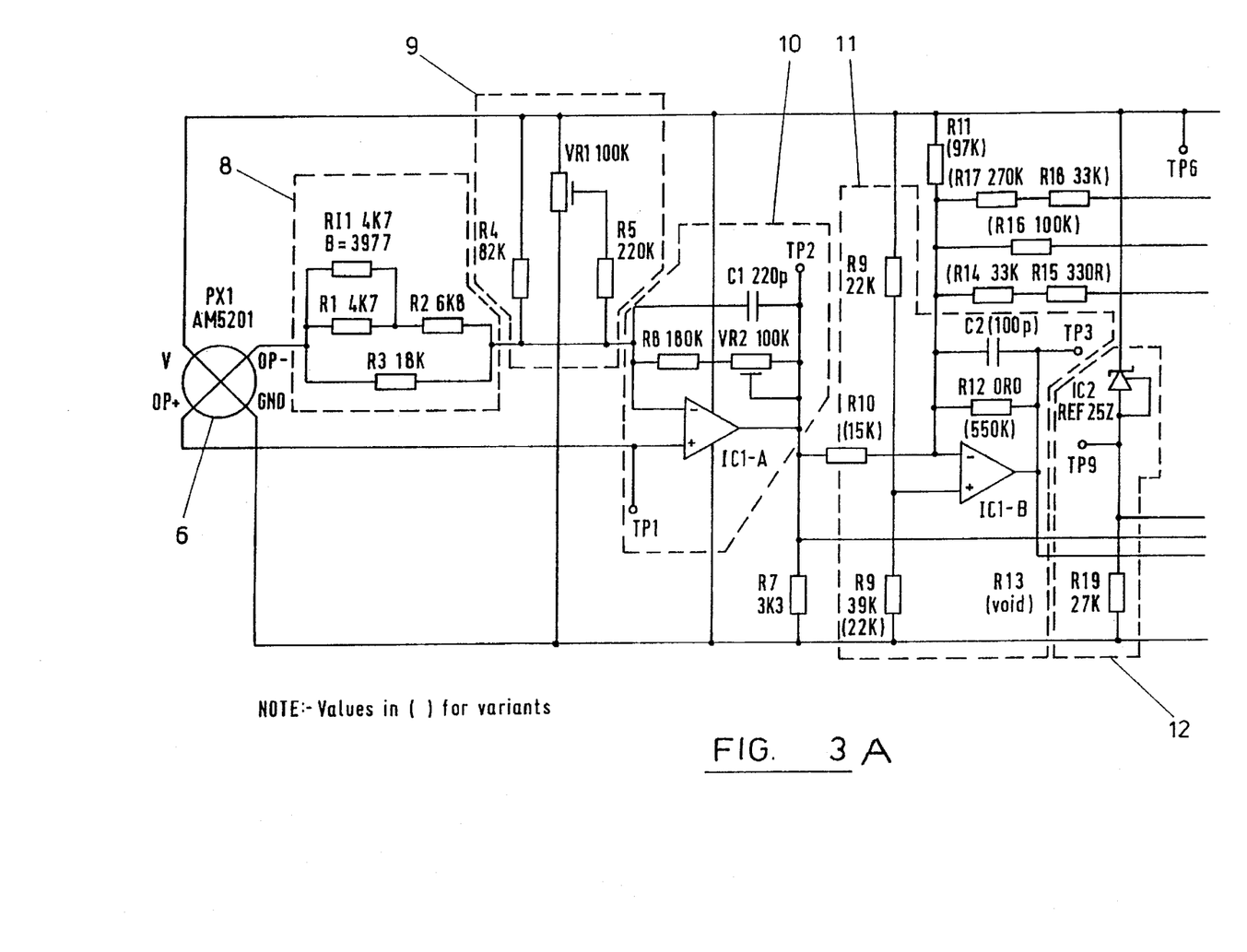
FIG. 3 is a detailed circuit diagram.
Figure 3B:
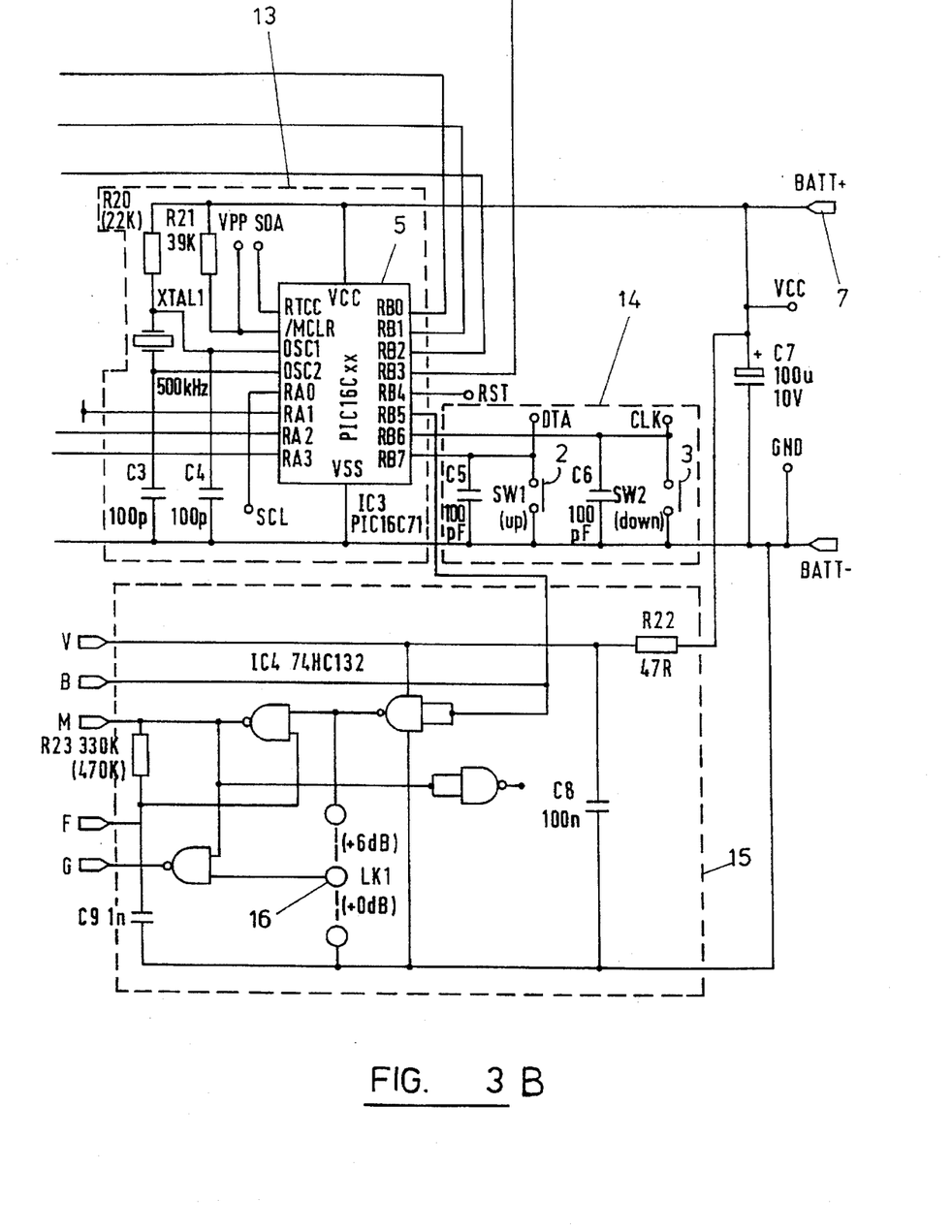
Figure 4:
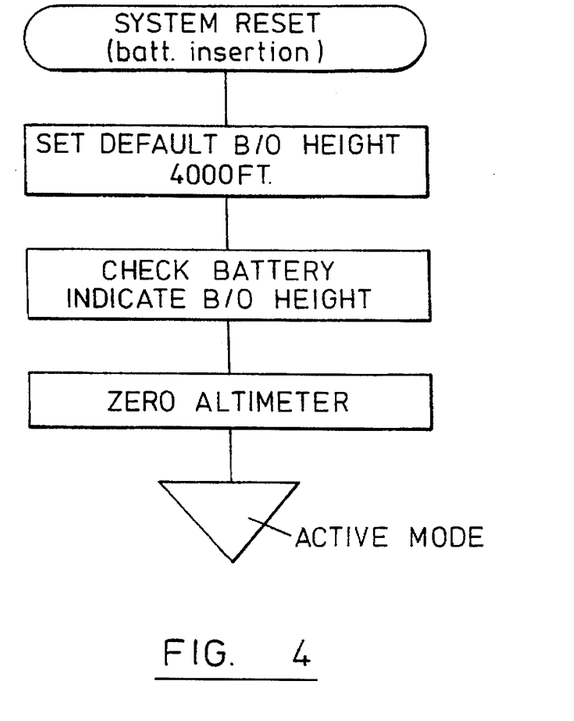
FIGS. 4 to 9 are logic flow diagrams illustrating the operation of the device.
Figure 5:
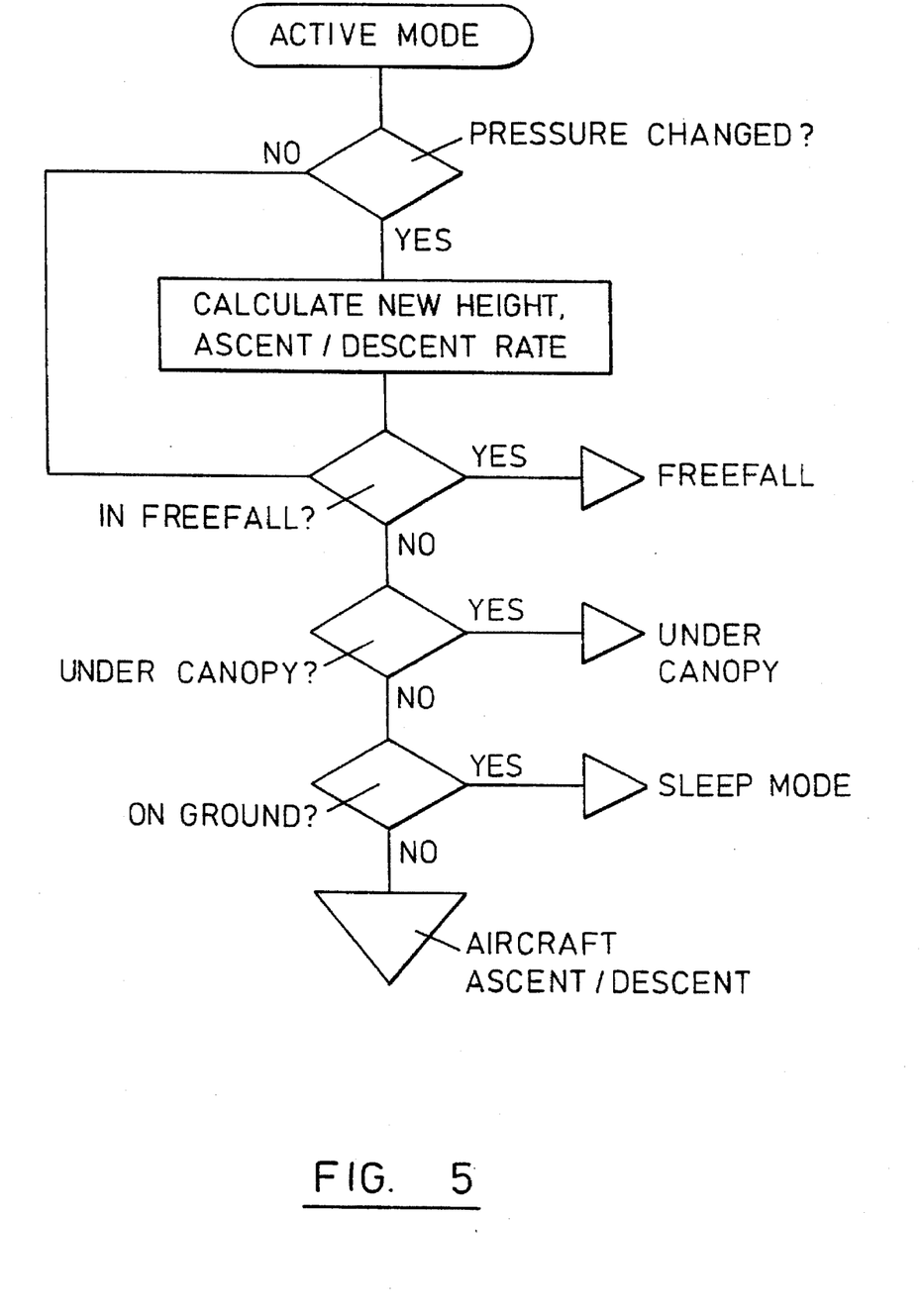
Figure 6:
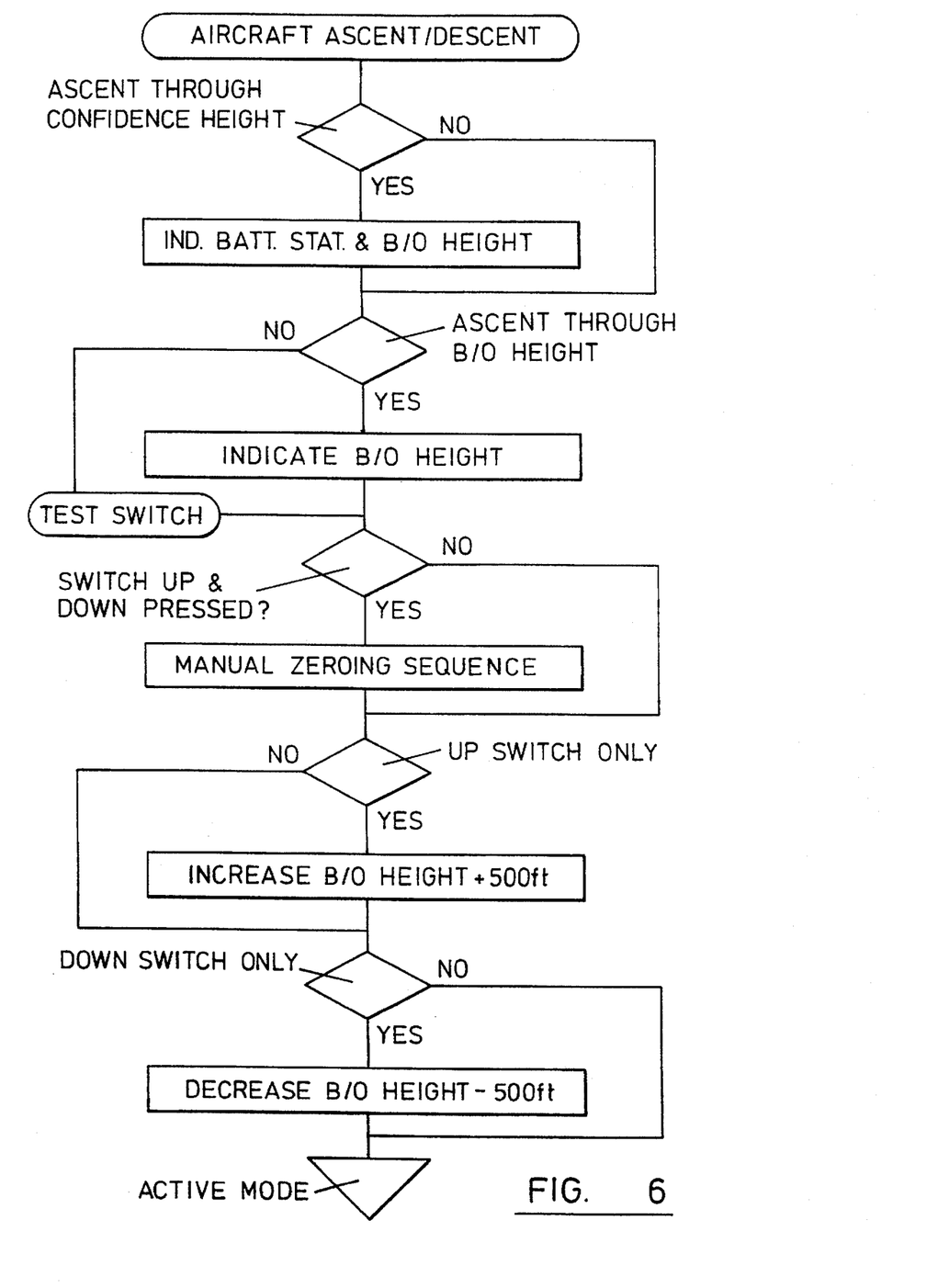
Figure 7:
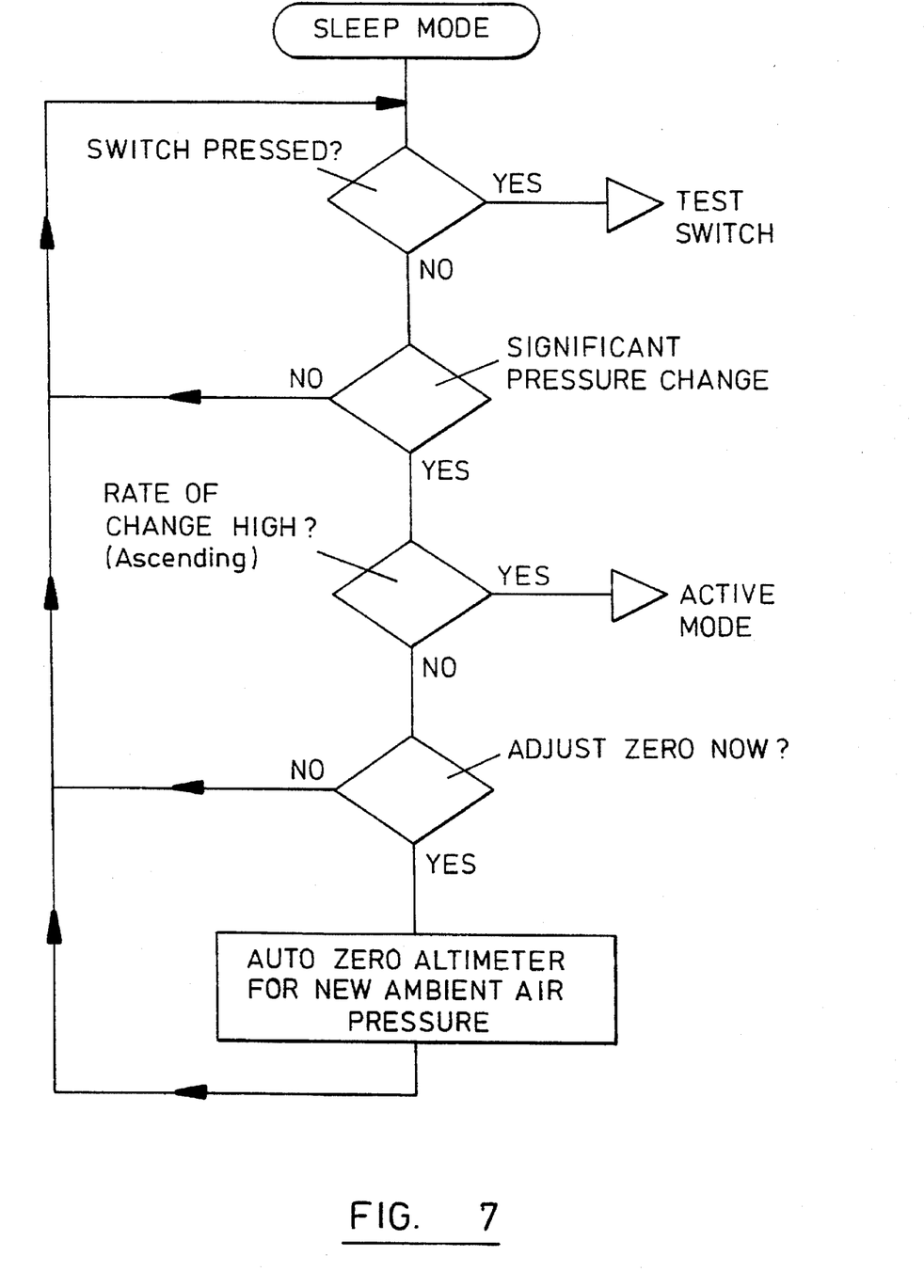
Figure 8:
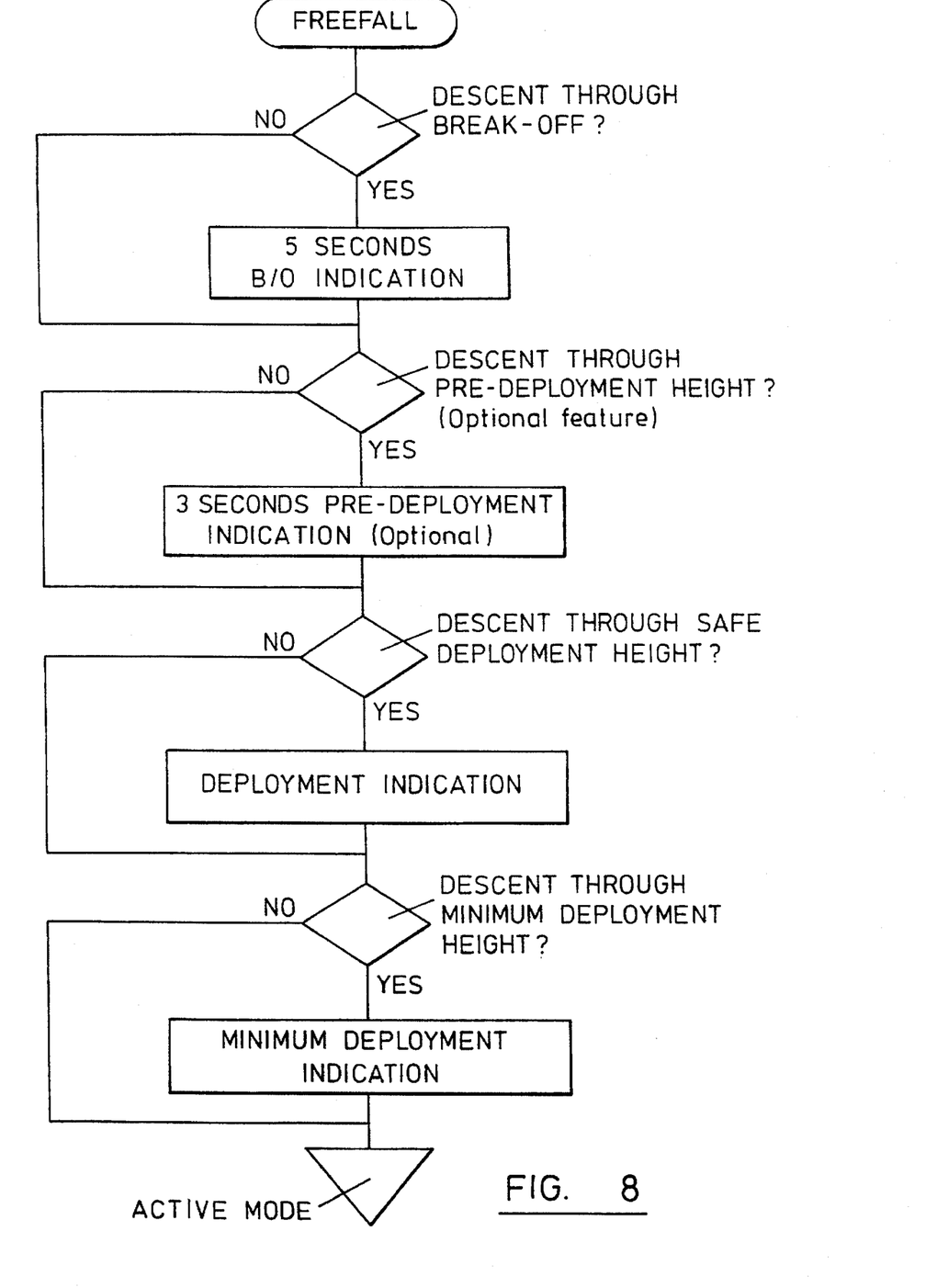
Figure 9:
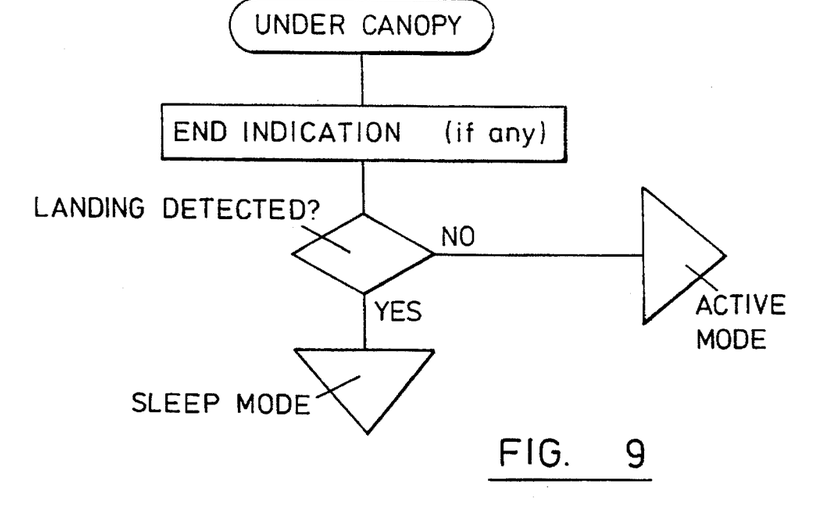

The electronic circuit is shown in more detail in FIG. 3. An output terminal of the pressure sensor 6 is connected to a temperature compensation circuit 8, which ensures that the device operates consistently at different temperatures. This is connected to a ground offset calibration circuit 9, which is adjusted during initial calibration of the device to set an absolute zero height. This ensures that all altimeters have the same operating pressure range.

The ground offset calibration circuit 9 is connected to an altitude span calibration circuit 10, which is also adjusted during initial calibration of the device to adjust the sensitivity of the device to changes in the ambient pressure. In other words, the circuit is adjusted to ensure that a sensed pressure change equivalent to a change in altitude of, for example, 1000 ft is read by the device as a change in altitude of 1000 ft.

The altitude span calibration circuit 10 is connected to a ratiometric reference circuit 11, which ensures that pressure readings remain constant for changing battery voltages. This in turn affects the accuracy of the device. The ratiometric reference circuit 11 is connected to the micro-controller 5.

The electronic circuitry also includes a battery condition reference circuit 12, which determines when the battery 7 is low. This circuit is connected to the micro-controller 5, which is contained within a control circuit 13. The ratiometric reference circuit 11 and a switching circuit 14 that includes the buttons 2,3 and associated de-bounce capacitors are also connected to the micro-controller 5.

An output of the micro-controller 5 is connected to a bleeper control circuit 15. The piezo-electric sounder device 4 (not shown) is connected to output terminals M and G of this circuit. Additional output terminals V, B and F are provided for optional connection to a visual indicator device such as a LED (not shown) or an alternative type of sounder device. The circuit 15 includes a jumper connection 16 that may be used to adjust the loudness of the sounder device.

Operation of the altimeter will now be described in detail. Operation of the device is controlled by the software contained in the micro-controller 5. The logical steps of this software are represented diagrammatically in the flow diagrams (FIGS. 4 to 9).

The altimeter can be zeroed manually by pressing and holding both buttons 2,3 simultaneously. This sends a signal to the micro-controller 5 which, after a period of approximately 1 second, enters a value $P_{GL}$ determined from the sensed air pressure P into the memory $M_{GL}$. When the value $P_{GL}$ has been entered into the memory $M_{GL}$, the micro-controller 5 sends a signal to the sounder 4 causing it to bleep once, to indicate that the altimeter has been zeroed. The buttons 2,3 can then be released. Obviously, the altimeter should only be zeroed when at ground level in the drop zone.

The micro-controller 5 is also programmed to zero itself automatically every 20 minutes. The automatic zeroing sequence is similar to the manual sequence described above, except that the sequence is initiated by the micro-controller 5 itself instead of by the user, and an audible signal is not emitted upon completion of the zeroing operation. Because the altimeter is zeroed automatically every 20 minutes, manual zeroing is not normally necessary. This makes the altimeter particularly convenient to use and reduces the risk of the altimeter providing inaccurate altitude signals because of failure to zero it before take off or imprecise manual zeroing. It is only normally necessary to zero the altimeter manually if taking off within 20 minutes of arriving at the drop zone.

The buttons 2,3 are also used to check and set the chosen break off height $H_{BO}$. In order to check the break off height $H_{BO}$, either one of the buttons 2,3 is pressed and released. This sends a signal to the micro-controller 5, which responds by reading the value in the memory $M_{BO}$ and sending a series of signals to the sounder 4, causing it to indicate the stored break off height by emitting a series of bleeps. The stored break off height $H_{BO}$ is indicated by one bleep for each interval of 1000 ft AGL followed, if appropriate, by a longer pause and a further bleep to indicate an additional 500 ft AGL. These signals may, for example, be represented as follows:

| B/O height | Signal |
|---|---|
| 3000 ft AGL | "Bleep . . . Bleep . . . Bleep" |
| 3500 ft AGL | "Bleep . . . Bleep . . . Bleep . . . . . . Bleep" |
| 4000 ft AGL | "Bleep . . . Bleep . . . Bleep . . . Bleep" |

The chosen break off height $H_{BO}$ can be changed by pressing and holding one of the buttons 2,3. The break off height is increased by pressing and holding the left-hand button 2, which has an "up" arrow printed next to it on the altimeter casing 1. This sends a signal to the micro-controller 5, which responds by first reading the current value stored in the memory $M_{BO}$ and then increasing that value in increments of 500 ft. Simultaneously, the micro-controller 5 sends signals to the sounder 4 to indicate the break off height $H_{BO}$ stored in memory $M_{BO}$ and the new value each time it changes. Thus, as the button 2 is held down, the user will first hear a signal indicating the break off height currently stored in memory $M_{BO}$, followed by further signals each time that height is incremented. The user releases the button when the signals indicate that the desired break off height has been stored in memory $M_{BO}$.

For example, when the break off height $H_{BO}$ is changed from 3000 ft AGL to 4000 ft AGL, the user will hear the following sequence of signals:

"Bleep . . . Bleep . . . Bleep" (Current value 3000 ft AGL)
"Bleep . . . Bleep . . . Bleep . . . Bleep" (New value 3500 ft AGL)
"Bleep . . . Bleep . . . Bleep . . . Bleep" (New value 4000 ft AGL)

The break off height stored in memory $M_{BO}$ may range from 3000 ft to 12000 ft AGL, in intervals of 500 ft.

The stored break off height $H_{BO}$ is reduced by pressing and holding the right-hand button 3, which has a "down" arrow printed next to it on the altimeter casing 1. The sequence by which the micro-controller 5 checks and changes the value $H_{BO}$ stored in the memory $M_{BO}$ and indicates that value to the user is equivalent to that described above.

Once the break off height $H_{BO}$ has been set and the altimeter zeroed (which will usually occur automatically), no further manual operations are necessary. Therefore, unless the user chooses to change the break off height, it is not normally necessary to touch the altimeter during use. The altimeter can thus be fitted inside the parachutist's helmet and forgotten about, at least until the battery has to be changed. The possibility of human error, for example by forgetting to switch the altimeter on or inaccurately zeroing it before use, is almost eliminated. This makes the altimeter very reliable and safe to use.

The need to switch the altimeter on is avoided owing to the fact that even when the altimeter is in the stand-by state, the micro-controller 5 is programmed to check the ambient air pressure P every 5 seconds and watch for any significant changes, which might indicate that the parachutist has started to ascend. As soon as any such change is sensed, the micro-controller 5 is programmed to switch the altimeter to the active state, so that the air pressure is then constantly monitored until the parachutist returns to ground level. This operation will now be described in more detail.

As mentioned above, the altimeter is normally in a stand-by state, in which most of the electronic circuit components are switched off to conserve battery life. The micro-controller 5 is, however, programmed to activate the circuitry once every 5 seconds and receive a signal P from the pressure sensor 6. The micro-controller 5 determines from this signal and from the value $P_{GL}$ stored in memory $M_{GL}$ the current height $H_{AGL}$ of the altimeter above ground level. If this height $H_{AGL}$ exceeds 300 ft AGL, the electronic circuitry is switched to the active state and remains in that state until the micro-controller 5 determines that the altimeter has returned to ground level. The micro-controller 5 is programmed not to reset the ground level pressure value $P_{GL}$ while the circuitry is in the active state. The altimeter will not, therefore, be reset automatically after take off. The altimeter can, however, be reset manually while in the active state, by pressing and holding the buttons 2,3 simultaneously.

As soon as the altimeter enters the active state, the micro-controller 5 checks the current state of charge of the battery 7 and sends a signal to the sounder 4, causing it to emit an audible signal that indicates the battery status, followed by a further signal to indicate the break off height $H_{BO}$ stored in memory $M_{BO}$. The battery status signal consists of a double bleep if the battery is fully charged, and a continuous two second bleep if the battery is only partially charged. This indicates that the battery 7 still has sufficient charge for the present jump but that it should be replaced at the next opportunity. If the altimeter does not emit an audible signal, then the battery is flat and the altimeter will not function until a new battery has been fitted.

The break off height signal, which follows the battery status signal, consists of a series of bleeps that represent the break off height $H_{BO}$ stored in the memory $M_{BO}$. The format of the bleeps is the same as that emitted when checking the break off height by pressing one of the buttons 2,3 as described above. For example, if the battery is good and the break off height $H_{BO}$ is set at 3000 ft AGL, the altimeter will emit the following signal:

"BleepBleep" (battery good)
"Bleep . . . Bleep . . . Bleep" (B/O height 3000 ft AGL).

Because the micro-controller 5 checks the height $H_{AGL}$ every 5 seconds when the altimeter is in the stand-by state and emits an audible signal when $H_{AGL}$ exceeds 300 ft AGL, this signal is normally generated during the climb at a height of between 300 ft and 500 ft AGL. This serves as a "confidence" signal and if the parachutist does not hear it by the time he reaches an altitude of about 1000 ft, he knows that the altimeter is not operating correctly.

The micro-controller 5 is also programmed to emit a further confidence signal (representing the $H_{BO}$ value) when the aircraft reaches the break off height. This gives the parachutist an opportunity to check the accuracy of the altimeter by comparison with the aircraft's altimeter or his own visual altimeter, and a second opportunity to check the state of activity of the altimeter.

The micro-controller 5 monitors the altitude $H_{AGL}$ constantly and is programmed to recognise the moment at which the altitude starts to decrease at a rate of at least 80 ft/sec. This indicates that the parachutist is in free fall and the micro-controller responds by disabling the buttons 2,3 so that the break off height value $H_{BO}$ stored in memory $M_{BO}$ and the ground level pressure value $P_{GL}$ stored in memory $M_{GL}$ cannot then be adjusted. This prevents the altimeter being accidentally reset, for example by vibrations within the parachutist's helmet.

As soon as the sensed height $H_{AGL}$ corresponds to the break off height $H_{BO}$, the micro-controller 5 sends a signal to the sounder 4, causing it to emit a series of bleeps at a rate of, for example, two per second for a period of five seconds. This warns the parachutist that he has reached his chosen break off height and that he should therefore break off and deploy his parachute.

If the parachutist deploys his parachute, this will slow his descent and the micro-controller 5 is programmed to recognise the moment when the speed of descent falls to less than 40 ft/sec, which indicates that the parachute has been successfully deployed. When this point has been reached, the micro-controller 5 is programmed not to send any further signals to the sounder 4, unless the speed of descent increases to more than 80 ft/sec again. This might happen if the parachute fails after deployment or if the parachutist releases the first chute, for example because it has become tangled. If this situation arises, the micro-controller 5 recommences emitting altitude warning signals via the sounder 4 at the appropriate heights.

The micro-controller 5 includes a further memory $M_{SDH}$ that contains a value representing the standard deployment height (for example, 2500 ft AGL). This is recognised as the standard minimum height at which the chute should be deployed. If the descent speed has not fallen to less than 40 ft/sec by the time the height $H_{AGL}$ has fallen to less than the value contained in the memory $M_{SDH}$, the micro-controller 5 is programmed to send a further signal to the sounder 4, causing it to emit a second warning. This warning signal consists of double speed bleeps (e.g. 4 per second) and continues until the descent speed falls to less than 40 ft/sec.

The micro-controller 5 contains yet another memory $M_{MDH}$ that contains a value representing the minimum safe deployment height, for example 1500 ft AGL. If the descent speed has still not fallen to less than 40 ft/sec by the time the sensed height $H_{AGL}$ corresponds to the value contained in $M_{MDH}$, the warning signal changes to a continuous bleep, which does not stop until either the descent speed falls to less than 40 ft/sec or the parachutist hits the ground.

The values contained in the memories $M_{SDH}$ and $M_{MDH}$, are entered into those memories during programming of the micro-controller. Those values cannot readily be changed by the user of the altimeter.

The parachutist is thus provided with two additional altitude warning signals beyond the break off warning if, for any reason, he has not deployed his main parachute or it has not deployed correctly. This gives him adequate warning to deploy his parachute or, if his main chute has failed, to cut away from that chute and use his reserve. The final warning, at a height of 1500 ft AGL, is regarded as the last point at which the parachute may be safely deployed and represents a free fall time of approximately 8 seconds to impact.

If the break off height $H_{BO}$ is set to 3500 ft AGL or less, the second altitude warning signal at 2500 ft AGL will start before the break off signal has finished. The break off signal may thus last for less than 5 seconds. The 2500 ft warning signal will, however, commence immediately that height is reached and will not be delayed because the break off signal has not finished.

In a preferred embodiment, the micro-controller 5 is programmed to send a signal to activate the sounder at an altitude of approximately 100 ft above each of the height limits mentioned above, which will result in the altimeter emitting the warning signals approximately 0.5 sec early. This is to allow for the reaction time of the parachutist, and enables the parachutist to deploy the parachute at precisely the chosen height.

The micro-controller 5 is programmed to recognise the moment at which the decent speed returns to zero and, providing there is no significant change in the sensed altitude for 20 seconds after then, it responds by switching off most of the electronic components and returning the altimeter to the stand-by state. Therefore, once the parachutist has landed, the altimeter switches itself off, so preserving the battery. Battery life is estimated to be approximately 500 hours in the active state (i.e. when in the aircraft or during free-fall) and approximately 13000 hours (18 months) in the stand-by state.

Various modifications of the altimeter are, of course, possible. For example, the altimeter may include more memories for storing predetermined heights and the microcontroller 5 may be programmed to generate an audible signal whenever the height $H_{AGL}$ corresponds to one of those predetermined heights. This may be particularly useful for display teams or for the parachute instructors.

I claim:

1. An altimeter for use by parachutists, the altimeter comprising:

a sensor means for sensing ambient air pressure and generating a signal P representing the sensed pressure;

a first digital electronic memory $M_{GL}$ for storing a value $P_{GL}$ determined from the ambient air pressure signal P at ground level, and means for entering said value $P_{GL}$ into said memory;

a digital electronic processor means connected to said sensor means and said first memory $M_{GL}$ and programmed to determine from said signal P and said value $P_{GL}$ the height $H_{AGL}$ of the altimeter above ground level;

a second digital electronic memory $M_{BO}$ for storing a value $H_{BO}$ representing a desired break off height and means for entering a value into said second memory;

a third digital electronic memory $M_{SDH}$ for storing a value $H_{SDH}$ representing a predetermined standard deployment height, and a sounder device connected to said digital electronic processor so as to receive a signal therefrom and to emit an audible signal when said signal is received;

said digital electronic processor being connected to said second and third memories $M_{BO}$ and $M_{SDH}$ and programmed to compare said height $H_{AGL}$ with said values $H_{BO}$ and $H_{SDH}$ and to send signals to said sounder device causing said sounder device to emit a first audible signal when said height $H_{AGL}$ corresponds to the value $H_{BO}$ and a second audible signal when the sensed height $H_{AGL}$ corresponds to the value $H_{SDH}$.

2. An altimeter as claimed in claim 1, wherein the digital electronic processor means comprises a programmable interface controller.

3. An altimeter according to claim 1, wherein said means for entering said value $H_{BO}$ into said memory $M_{BO}$ comprises a manually operable switch means.

4. An altimeter according to claim 1, wherein said means for entering said value $P_{GL}$ into said memory $M_{GL}$ comprises a manually operable switch means.

5. An altimeter according to claim 1, wherein said digital electronic processor means is programmed to enter said value $P_{GL}$ into said memory $M_{GL}$ at predetermined time intervals.

6. An altimeter according to claim 1, wherein said digital electronic processor means is programmed to send a signal to the sounder device causing the device to emit an audible signal when, during the ascent, the sensed height $H_{AGL}$ exceeds the value $H_{BO}$.

7. An altimeter according to claim 1, wherein said altimeter includes a source of electrical power and said digital electronic processor means is programmed to monitor the state of charge of said source of electrical power and to send a signal to activate said sounder device when said state of charge falls below a predetermined value.

8. An altimeter according to claim 1, wherein said altimeter includes a fourth digital electronic memory $M_{MDH}$ for storing a value $H_{MDH}$ representing a predetermined minimum deployment height, and said digital electronic processor is connected to said fourth memory $M_{MDH}$ and programmed to compare said height $H_{AGL}$ with said value $H_{MDH}$ and to send a signal to activate said sounder device when said height $H_{AGL}$ corresponds to the value $H_{MDH}$.

9. An altimeter according to claim 1, wherein said digital electronic processor means is programmed to monitor the rate of descent and to disable said means for entering said values $H_{BO}$ and $P_{GL}$ into said memories $M_{BO}$ and $M_{GL}$ when the rate of descent exceeds a predetermined value.

10. An altimeter according to claim 1, wherein said digital electronic processor means is programmed to monitor the rate of descent and to discontinue sending signals to activate said sounder device when the rate of descent falls below a predetermined value.

11. An altimeter according to claim 1, said altimeter being switchable between a stand-by state, in which power consumption is reduced, and an active state, in which the pressure signal P is constantly monitored, said digital electronic processor means being programmed to switch the altimeter to said active state when a rapid increase in altitude is sensed.

12. An altimeter according to claim 11, wherein said digital electronic processor means is programmed to send a signal to the sounder device causing the device to emit an audible signal when the altimeter switches from the stand-by state to the active state.

13. An altimeter according to claim 11, wherein said digital electronic processor means is programmed to sense completion of the descent and to switch the altimeter from the active state to the stand-by state after completion of the descent is sensed.

14. An altimeter according to claim 11, wherein said digital electronic processor means is programmed to sense the pressure signal P at predetermined time intervals when in the stand-by state and to switch the altimeter from the stand-by state to the active state in accordance with sensed changes in the pressure signal P.

15. An altimeter according to claim 14, wherein said digital electronic processor means is programmed to switch the altimeter from the stand-by state to the active state when the difference between the pressure signal P and the stored value $P_{GL}$ exceeds a predetermined limit.

* * * * *